(12) United States Patent
Hama et al.

(10) Patent No.: US 6,874,243 B2
(45) Date of Patent: Apr. 5, 2005

(54) MEASURING INSTRUMENT

(75) Inventors: Nobuyuki Hama, Kure (JP); Ichirou Okamoto, Kure (JP); Hideo Tanada, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/779,765

(22) Filed: Feb. 18, 2004

(65) Prior Publication Data

US 2004/0168332 A1 Sep. 2, 2004

(30) Foreign Application Priority Data

Feb. 27, 2003 (JP) ........................................ 2003-051141

(51) Int. Cl.[7] ................................................ G01B 3/14
(52) U.S. Cl. ............................ 33/551; 33/559; 33/572
(58) Field of Search .......................... 33/533, 549, 551, 33/553, 554, 556, 559, 572; 73/105

(56) References Cited

U.S. PATENT DOCUMENTS

| | | | |
|---|---|---|---|
| 6,209,217 B1 | 4/2001 | Tsuruta et al. ................. 33/554 |
| 6,295,866 B1 * | 10/2001 | Yamamoto et al. ............ 33/572 |
| 6,307,084 B1 * | 10/2001 | Matsuki et al. ................ 33/561 |
| 6,327,789 B1 * | 12/2001 | Nishimura et al. ............ 33/559 |
| 6,484,571 B1 * | 11/2002 | Hidaka et al. ................. 33/556 |
| 6,546,643 B2 * | 4/2003 | Lotze et al. ................... 33/559 |
| 6,604,295 B2 * | 8/2003 | Nishimura et al. ............ 33/554 |
| 2001/0025427 A1 * | 10/2001 | Lotze et al. ................... 33/559 |
| 2002/0124427 A1 * | 9/2002 | Nishimura et al. ............ 33/554 |
| 2004/0177520 A1 * | 9/2004 | Nakamura et al. ............ 33/1 M |

FOREIGN PATENT DOCUMENTS

| | | |
|---|---|---|
| JP | A 5-340706 | 12/1993 |
| JP | Y2 2556550 | 8/1997 |

* cited by examiner

*Primary Examiner*—G. Bradley Bennett
(74) *Attorney, Agent, or Firm*—Oliff & Berridge, PLC

(57) ABSTRACT

Centroid moments of components of an arm (220) are calculated based on three-dimensional model data and mass of the components, the centroid moments being combined to calculate a centroid position (G) of the entirety of the arm (220). The arm (220) is adjusted and swingably supported so that a stylus (222D) provided on an end of the arm (220) being swingably supported by a support (210) that moves relative to a workpiece (1) touches the workpiece (1) with a predetermined measuring force and the centroid position (G) is located on a horizontal plane including the fulcrum when the support (210) is inclined by an angle in the middle of an angle range within which the support (210) is rotated by a moving section (130). The measuring force is hardly fluctuated when the support (210) is inclined.

6 Claims, 6 Drawing Sheets

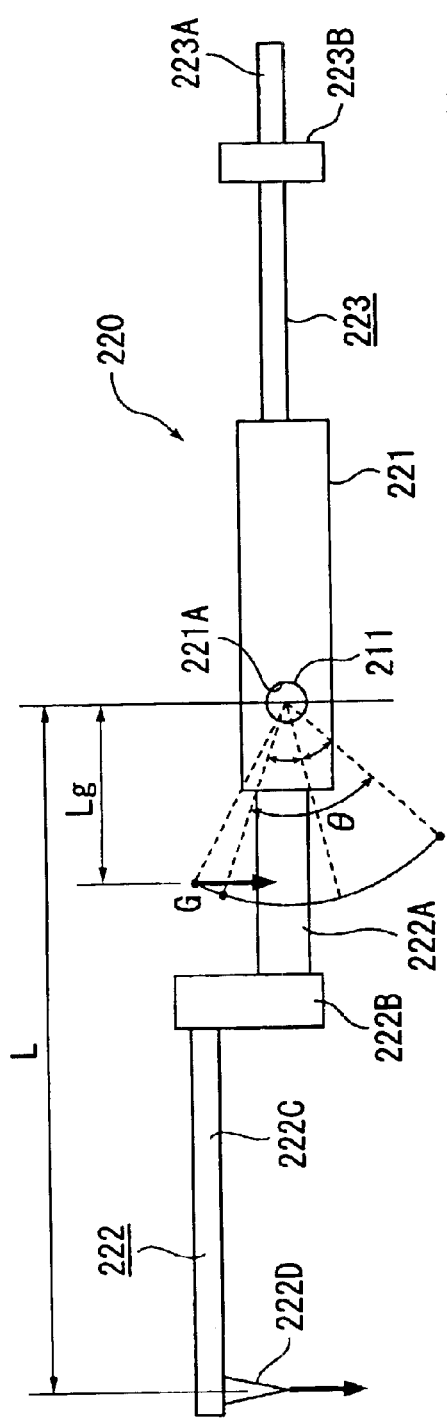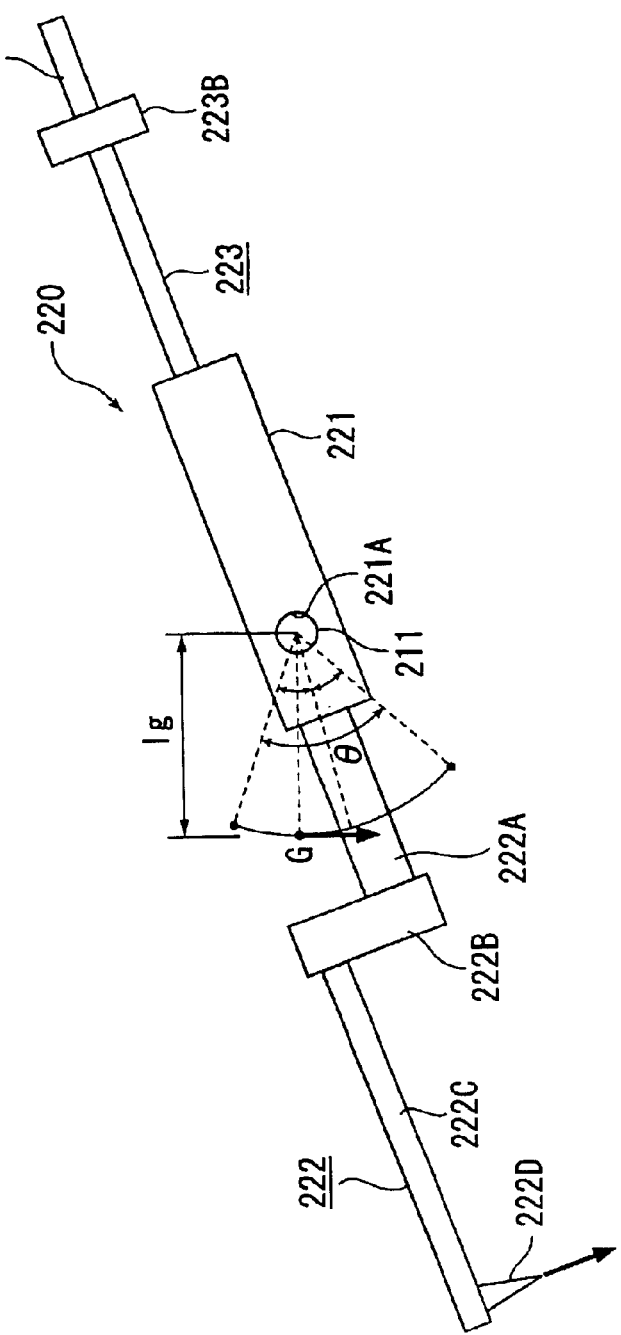
FIG.4A
FIG.4B

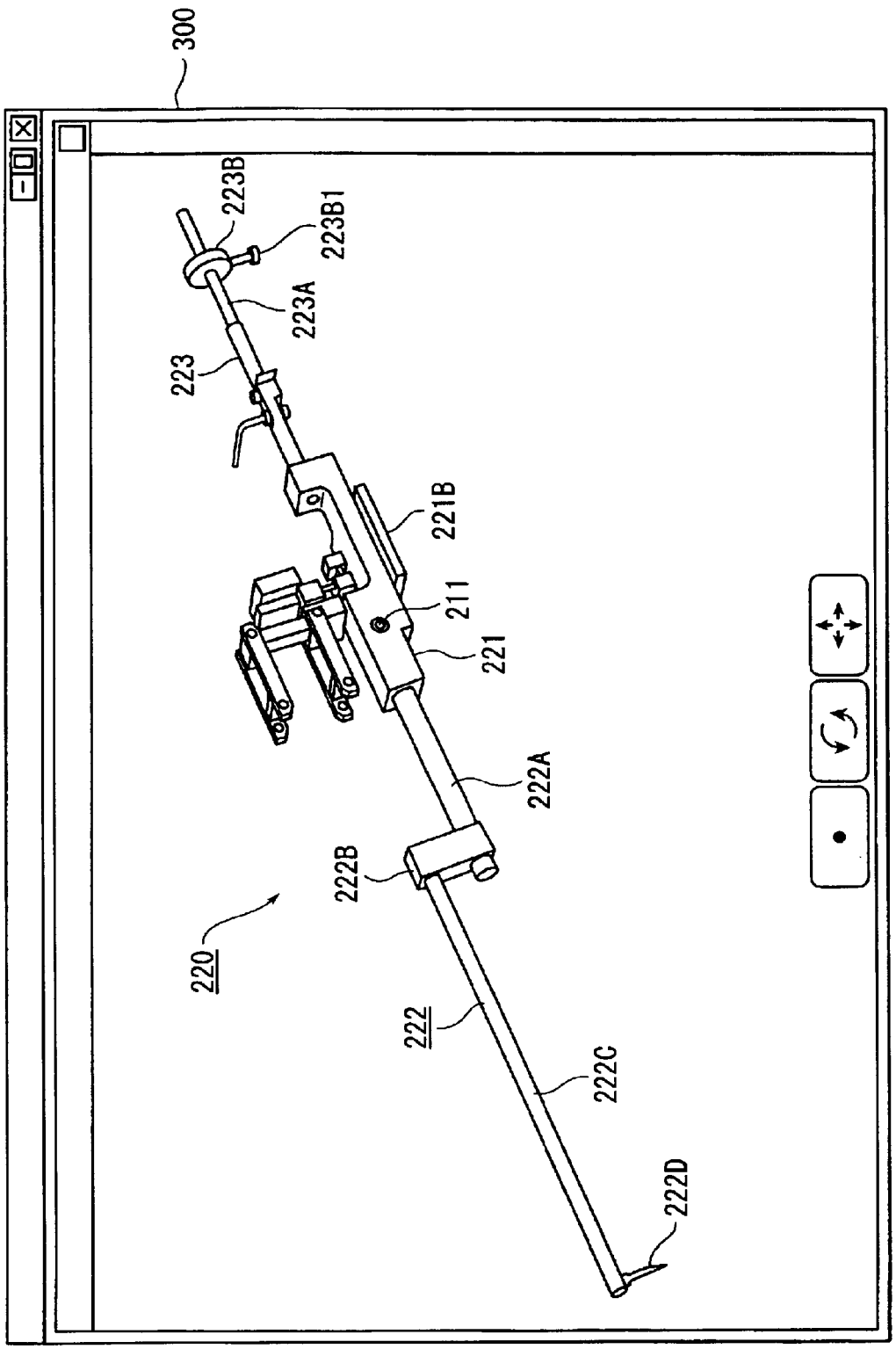

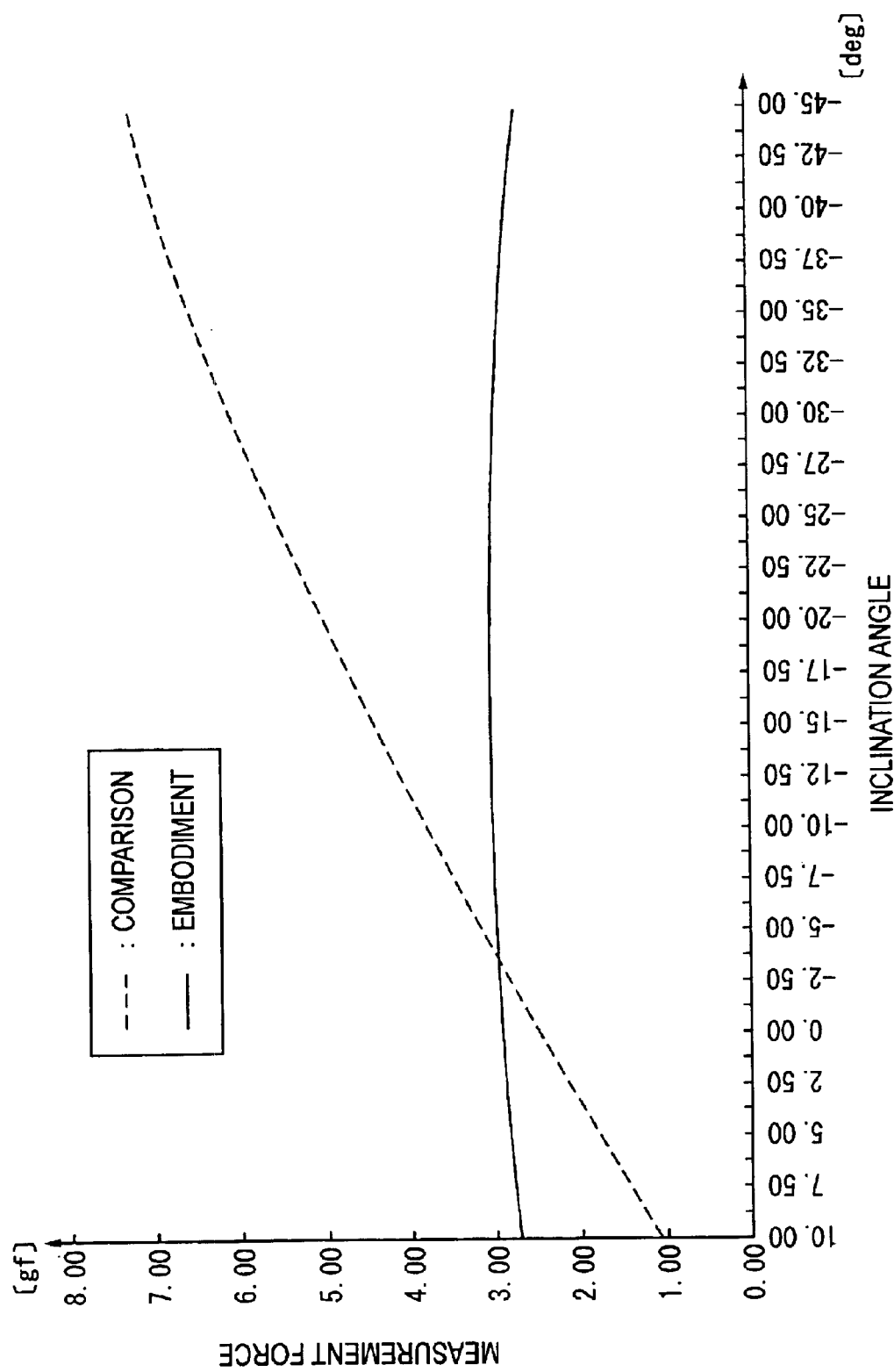

MEASURING INSTRUMENT

BACKGROUND OF THE INVENTION

1. Field of the Invention

The present invention relates to a measuring instrument that measures a swing movement of a swinging body when a probe of the swinging body touches a workpiece with a predetermined measuring force.

2. Description of Related Art

Conventionally, measuring instruments for measuring a surface texture such as roughness, waviness, contour and roundness of a workpiece, e.g. surface roughness measuring instrument, contour measuring instrument and roundness measuring instrument, have been known. In such measuring instruments, a sensor scans the surface of the workpiece to collect scanning data, based on which the surface texture is obtained. The sensor includes a swingably supported arm having a probe to be in contact with the surface of the workpiece at a tip end thereof. In the conventional measuring instrument, the arm is swung according to the movement (displacement) of the probe in accordance with the irregularities on the workpiece surface and the swing amount is detected as scanning data.

A measuring instrument shown in Japanese Utility Model Registration No. 2556550 (P. 2, right column to P. 4, right column) has an arm swingably supported at a fulcrum. A probe to be in contact with and movable along a surface of a workpiece is provided on an end of the arm. On the other end of the arm, a weight and a motor for moving the weight are provided. A balance controller controls the motor to move the weight so that the probe touches the workpiece with a predetermined measuring force to balance the arm, where the probe is moved along the surface of the workpiece and the movement of the arm displacing together with the probe is measured, thereby measuring the surface texture of the workpiece.

However, according to the measuring instrument described in the Japanese Utility Model Registration No. 2556550, the inertia of the entire arm is increased on account of the motor provided on the arm, so that the frequency characteristics of the swinging probe may be deteriorated, which may result in deterioration in the swingability of the arm. Accordingly, tracking response to minute irregularities on the workpiece surface may be deteriorated, and when the scanning speed for moving the probe along the workpiece surface, i.e. moving speed of the probe relative to the workpiece surface is accelerated, measurement accuracy may be deteriorated. Therefore, it is difficult to increase the scanning speed and the measurement efficiency may not be improved. Further, since the the entire arm bears great inertia, when the probe is scanned along the workpiece surface, excessive measuring force in the scanning direction (i.e. pressing force of the probe against the workpiece in the scanning direction) may be applied, so that the workpiece surface and the probe may be damaged.

A measuring instrument shown in Japanese Patent Laid-Open Publication No. 05-340706 (P.3, left and right columns) also has an arm swingably supported at a fulcrum. A probe to be in contact with and movable along a surface of a workpiece is provided on an end of the arm. A spring that applies a biasing force for swingably moving the arm in a direction opposite to the direction for the probe to be into contact with the workpiece surface is provided on an end of the arm. On the other hand, an iron core projecting in a swing direction of the arm is provided on the other end of the arm. Further, a first coil is provided on the other end of the arm. A second coil is provided on the measuring instrument so that the iron core of the arm is capable of moving substantially in the axial direction of the central axis of the second coil. The measuring instrument further has a cylindrical magnetic component of a voice coil motor in which the first coil is capable of moving in the axial direction thereof. The probe is moved along the workpiece surface and the movement of the arm integrally displacing with the probe is read based on the current value from the second coil in which the iron core is relatively moved. The voice coil motor is actuated by passing an electric current to the first coil in accordance with the current value from the second coil so that the probe is in contact with the workpiece surface with a constant measuring force by generating a reaction force against the biasing force of the spring.

However, according to the measuring instrument disclosed in the Japanese Patent Laid-Open Publication No. 05-340706, in order to control the measuring force of the probe against the workpiece, wirings such as a lead wire for applying the electric current to the first coil of the swinging arm is necessary. Accordingly, a stress on account of the rigidity of the wiring is applied on the swinging arm as a disturbance while swingably moving the arm, thereby fluctuating the measuring force. Accordingly, a complicated wiring without applying disturbance on the arm is required, so that it is difficult to improve the productivity. Further, desired measuring force may not be obtained on account of the snapping of the wire caused by repeatedly applying a load on the wiring by the swinging movement of the arm. Further, since the arm swingably moves, the coil of the arm moves on an arc in the voice coil motor. In order to improve the accuracy of the measurement, the coil of the arm is required to linearly move in the axial direction relative to the magnetic component, however, it is difficult to convert the arc movement of the coil of the arm into a linear movement solely by the arrangement of the voice coil motor. Accordingly, the arc movement has to be corrected as a linear movement, which requires an additional circuitry for the linear conversion, so that the structure of the instrument becomes complicated and productivity improvement and cost reduction are difficult to be achieved.

A measuring instrument shown in Japanese Patent Laid-Open Publication No. 2000-111334 (P.3, right column to P.5, right column) also has an arm swingably supported at a fulcrum. A probe to be in contact with and movable along a surface of a workpiece is provided on an end of the arm. A movement sensor for detecting the swing movement of the arm is provided on the other end of the arm. A wire etc. is connected to the other end of the arm. A measuring force adjuster for adjusting a measuring force to bring the probe into contact with the workpiece by applying a tension on the wire along the swinging direction of the arm by a motor and the like is provided on the measuring instrument. The arm of the measuring instrument is capable of being rotated so that the angle between the probe relative to the horizontal surface and a direction for the probe to be in contact with the workpiece, i.e. the angle of the arm relative to the longitudinal horizontal surface of the arm can be changed. A command value for determining the drive condition of the measuring force adjuster so that an appropriate measuring force in accordance with the combination of the type of the probe, the inclination angle of the sensor (i.e. the turn angle of the arm) and the like is applied is inputted in advance. In the measuring device, the type of the probe is inputted and the inclination angle of the sensor during measurement is detected to read the corresponding command value in accordance with the detected result, so that the drive condition of the measuring force adjuster is controlled to keep a constant measuring force in measuring the surface texture of the workpiece.

However, in the measuring device disclosed in the Japanese Patent Laid-Open Publication No. 2000-111334, a multiple of factors such as the inclination angle and the type of the probe influence on the measuring force and more number of the command value in accordance with the combination of the factors are required. Accordingly, complicated process is required for calculating the command value for achieving a constant measuring force in any of the combinations and for inputting the multiple number of the command values, so that the improvement in the productivity is required.

As described above, in the measuring instrument disclosed in the Japanese Utility Model Registration No. 2556550, the inertia of the arm is increased on account of the presence of the motor for moving the weight for keeping the constant measuring force and the tracking response of the probe relative to the irregularities on the workpiece surface is deteriorated, so that the measurement efficiency cannot be improved on account of the difficulty in increasing the scanning speed of the probe and the workpiece surface may be damaged by the probe. In the measuring device disclosed in the Japanese Patent Laid-Open Publication No. 05-340706, the wiring of the voice coil motor for keeping the constant measuring force may influence on the swing movement of the arm and the design without being influenced by the wiring is difficult. Further, a circuitry for converting the arc movement in the voice coil motor into a linear movement is required and the productivity may not be improved. In the measuring instrument disclosed in the Japanese Patent Laid-Open Publication No. 2000-111334, it is difficult to calculate and input the command value for setting the driving condition of the measuring force adjuster for keeping a constant measuring force and improvement in the productivity is desired.

SUMMARY OF THE INVENTION

In light of the above, an object of the present invention is to provide a measuring instrument capable of restraining fluctuation in the measuring force and easily achieving excellent measurement result.

A measuring instrument according to an aspect of the present invention has: a body movable relative to a workpiece; a swinging body swingably supported by the body and having a probe to be in contact with the workpiece; and a movement sensor for detecting a swinging movement of the swinging body, in which the body is movable so that the body is inclined within a predetermined angle range relative to a horizontal surface, and in which the swinging body is swingably supported so that a centroid position thereof is located on a plane parallel to the horizontal surface including a point where the swinging body is supported by the body when the body is inclined by an angle approximately in the middle of the predetermined angle range.

The phrase "inclined by an angle approximately in the middle of the predetermined angle range" means that the body is inclined by approximately half angle of the predetermined inclinable angle range. Accordingly, the inclinable angle at the angle position in both plus and minus directions becomes approximately equal.

In the present invention, the swinging body having the probe to be in contact with the workpiece is supported on the body movable relative to the workpiece within the predetermined angle range relative to the horizontal surface in a manner that the centroid position of the swinging body is located on the plane parallel to the horizontal surface and including the point at which the swinging body is supported by the body when the body is inclined by the angle approximately in the middle of the predetermined inclinable angle range. Accordingly, the fluctuation of the distance from the point at which the swinging body is supported to the centroid position caused by the inclination of the body can be restrained to the minimum and the fluctuation of the measuring force for the probe of the swinging body to be in contact with the workpiece can be restrained, so that, once the measuring force is set, the re-adjustment of the measuring force is not necessarily re-adjusted even when the body is inclined and the measurement process can be continuously conducted, thereby easily obtaining an excellent measurement result.

In the above aspect of the present invention, the centroid position of the swinging body may preferably be calculated based on a centroid moment calculated in accordance with barycentric coordinates of components of the swinging body with a fulcrum of the swinging body being set as an origin and the mass of the components.

According to the above aspect of the present invention, the centroid position of the swinging body is calculated based on the centroid moment obtained in accordance with the barycentric coordinates with the fulcrum of the components of the swinging body as the origin and the mass of the components. Accordingly, it becomes easy to support the swinging body in a manner that the fluctuation of the measuring force can be restrained and an excellent measurement result can be easily obtained, thereby improving the productivity.

In the above aspect of the present invention, the barycentric coordinates of the components of the swinging body may preferably be calculated based on a three-dimensional data of the components by computer aided design.

In the above aspect of the present invention, the barycentric coordinates of the components of the swinging body are calculated based on the three-dimensional data of the components using computer aided design. The centroid position of the swinging body can be easily calculated using the computer aided design and the swinging body can be easily arranged so that the swinging body is supported by the body while restraining the fluctuation of the measuring force to easily obtain an excellent measurement result, thereby improving productivity.

In the above aspect of the present invention, the swinging body may preferably have a measuring force setting means for bringing the probe into contact with the workpiece with a predetermined measuring force, the measuring force setting means being provided on a side opposite to the centroid position of the swinging body relative to the fulcrum supported by the body.

In the above aspect of the present invention, the measuring force setting means for bringing the probe into contact with the workpiece with a predetermined measuring force is provided on the side opposite to the centroid position of the swinging body relative to the fulcrum supported by the body. Accordingly, even when the measuring setting means works in adjusting the measuring force, since the measuring force setting means is provided on a side opposite to the centroid position, the centroid position is hardly fluctuated, so that the magnification of the fluctuation of the measuring force caused by the movement of the body in adjusting the measuring force can be prevented, thereby facilitating the adjustment of the measuring force for easily obtaining an excellent measurement result.

In the above aspect of the present invention, the measuring force setting means may preferably be a measuring force weight capable of moving toward and away from the fulcrum at which the swinging body is supported by the body.

In the above aspect of the present invention, the measuring force weight movable toward and away from the fulcrum at which the swinging body is supported by the body is provided as the measuring force setting means. Accordingly, even when the body is moved, the fluctuation of the measuring force can be minimized with a simple structure and the measuring force can be easily adjusted to obtain an excellent measurement result, thereby improving the productivity.

In the above aspect of the present invention, the swinging body may preferably have a centroid weight capable of moving in a direction approximately orthogonal to a line connecting the fulcrum supported by the body and a distal end of the probe, and the centroid position may preferably be adjusted by moving the centroid weight.

In the above aspect of the present invention, the centroid position is adjusted by moving the centroid weight in the direction approximately orthogonal to the line connecting the fulcrum supported by the body and the distal end of the probe. For instance, the centroid weight is disposed on a side opposite to the probe relative to the fulcrum. Since the centroid weight is movable in the direction approximately orthogonal to the line connecting the distal end of the probe and the fulcrum, the centroid moment hardly changes in accordance with the movement of the centroid weight and the measuring force when the probe is in contact with the workpiece is hardly changed. Accordingly, the centroid position of the swinging body can be efficiently adjusted.

BRIEF DESCRIPTION OF THE DRAWINGS

FIG. 4 is an illustration showing a centroid position of an arm of the aforesaid embodiment;

FIG. 5 is an illustration showing a CAD display image of the arm of the aforesaid embodiment; and FIG. 6 is a graph showing how a measuring force is fluctuated in accordance with an inclination angle in the aforesaid embodiment.

DETAILED DESCRIPTION OF PREFERRED EMBODIMENT(S)

Figure 1:
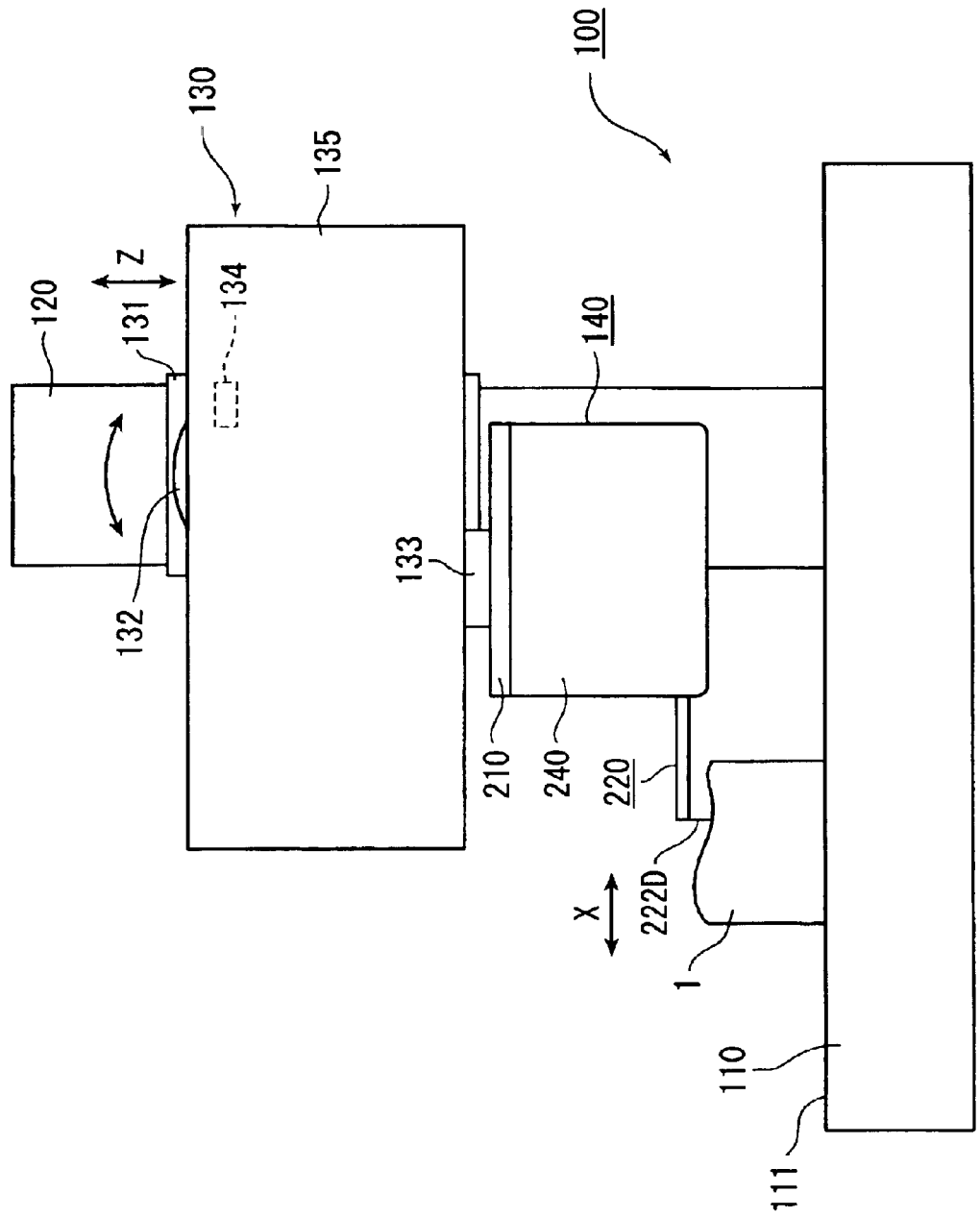
FIG. 1 is a schematic illustration showing an outline of an arrangement of a measuring instrument according to an embodiment of the present invention.
Figure 2:
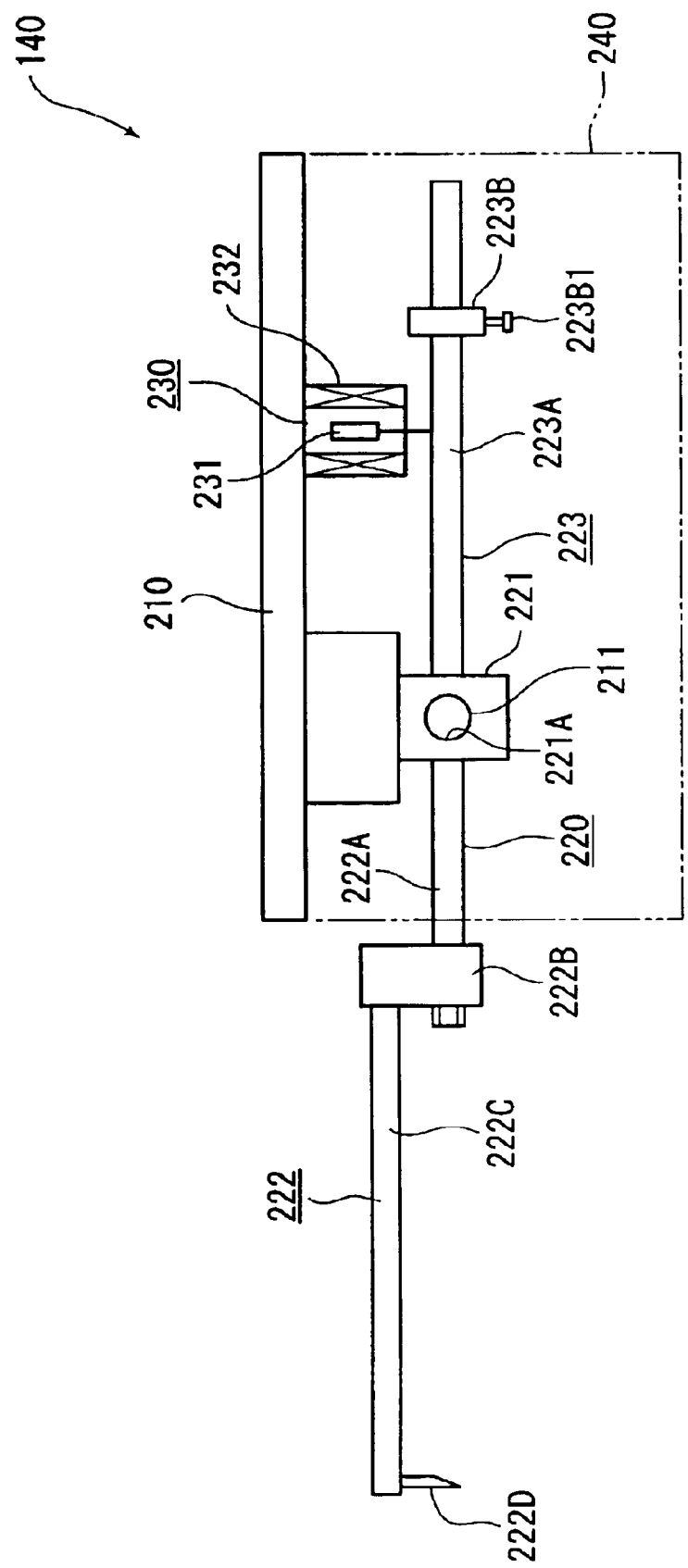
FIG. 2 is another schematic illustration showing an outline of a body of the measuring instrument according to aforesaid embodiment.

An arrangement of a measuring instrument according to an embodiment of the present invention will be described below with reference to attached drawings. Incidentally, though a surface-tracking measuring instrument will be described in the present embodiment, the present invention may be applied to other type of measuring instrument. FIG. 1 is a schematic illustration showing an outline of the measuring instrument. FIG. 2 is a schematic illustration showing an outline of the body of the measuring instrument. FIG. 3 is an illustration showing how the measuring instrument works. FIG. 4 is an illustration showing the centroid position of an arm.

(Structure of Measuring Instrument)

In FIG. 1, 100 denotes a measuring instrument, the measuring instrument 100 being a surface-tracking measuring instrument for measuring a shape of a workpiece 1. The measuring instrument 100 has a base 110, a column 120, a moving section 130 and a body 140.

The base 110 is held and fixed on, for instance, top of a desk, and is arranged as a table having a mount surface 111 on which the workpiece 1 is put. The column 120 is formed in a pole. The column 120 is provided on the base 110 in a manner that the column 120 projects upward on the mount surface 111 so that the axis thereof is substantially orthogonal to the mount surface 111 of the base 110.

The moving section 130 has a vertical slider 131 capable of moving on the column 120 in vertical direction (axis direction of the column 120: a direction indicated by an arrow Z in FIG. 1), a rotary section 132 rotatably provided on the vertical slider 131, a movement guide 135 provided on the rotary section 132, and a horizontal slider 133 capable of moving in parallel to the mount surface 111 of the base 110, i.e. in horizontal direction (a direction indicated by an arrow X in FIG. 1) along the movement guide 135 in a normal condition. An angle sensor 134 for detecting an angle inclined relative to the horizontal surface by driving the rotary section 132 to rotate the horizontal slider 133 is provided on the moving section 130.

The body 140 measures the shape of the workpiece by contacting the surface of the workpiece 1, which is integrated on the lower side of the horizontal slider 133 of the moving section 130. As shown in FIG. 2, the body 140 has a support 210 that is moved in the horizontal direction by the horizontal slider 133, an arm 220 (swinging body) swingably supported on the lower side of the support 210, a movement sensor 230 provided on the support 210 for detecting the swing movement of the arm 220, and a cover 240 provided on the support 210 for covering the arm 220 and the movement sensor 230 while exposing a part of the arm 220 to the outside.

The support 210 is movable in X-direction (horizontal direction) by the horizontal slider 133 while the upper side thereof stays along the mount surface 111 (horizontal surface) of the base 110 during normal condition. A shaft 211 for supporting the arm 220 is provided on the lower side of the support 210.

The arm 220 has a body 221 rotatably supported around the shaft 211 of the support 210, a measurement arm 222 attached to the body 221 and a measuring force setting means 223 provided on the body 221. A fitting hole 221A in which the shaft 211 is rotatably fitted is provided on the body 221. As shown in FIG. 5, a centroid weight 221B is adjustably, for instance, movably and detachably provided on the lower side of the body 221.

The measurement arm 222 has an arm 222A, an attachment 222B, a stylus holder 222C (components of swinging body), and a stylus 222D (probe). The arm 222A is formed approximately in a cylinder, of which an axial end (base end) being attached to a swinging end of the body 221 to extend from the body 221. The attachment 222B is detachably attached to the other end (distal end) of the arm 222A. The stylus holder 222C is attached to the attachment 222B. The stylus holder 222C is formed approximately in a cylinder and an axial end (base end) thereof is fixed to the attachment 222B to extend in parallel to the arm 222A in an opposite direction relative to the arm 222A. On the other end (distal end) of the stylus holder 222C, a through-hole (not shown) penetrating therethrough in diametrical direction is provided. The stylus 222D is formed in a cylindrical shape having an axial end (distal end) to be in point contact with a surface and the other end (base end) thereof is detachably fitted to the through-hole of the stylus holder 222C to extend in the diametrical direction of the stylus holder 222C.

The measuring force setting means 223 has a weight stick 223A and a measuring force weight 223B (components of swinging body). The weight stick 223A is formed approximately in a cylinder having a base end (a first end) in the axial direction attached to the other side of the body 221, i.e. a side opposite to the side on which the arm 222A of the measurement arm 222 is attached, to extend from the body 221 in parallel to and in a direction opposite to the arm 222A. The measuring force weight 223B is formed approximately in a disk-shape and has a movement hole (not shown) in which the weight stick 223A is slidably fitted approximately at the center thereof. A positioning screw 223B1 having an end advanceably and retractably projecting toward the inner circumference of the movement hole and being abutted to the outer circumference of the weight stick 223A is provided on the outer circumference of the measuring force weight 223B. The measuring force weight 223B is positioned and fixed by manipulating the positioning screw 223B1 to be movable on the weight stick 223A in the axial direction thereof.

Figure 3A:
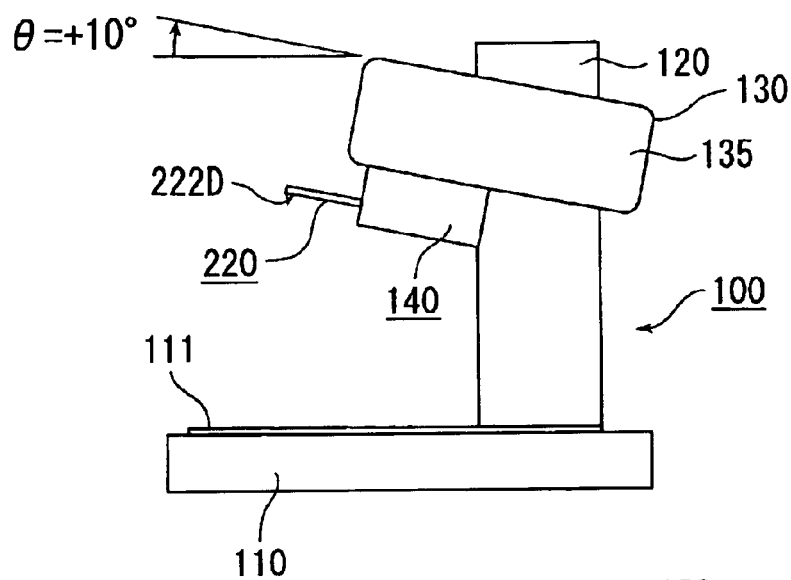
FIG. 3 is an illustration showing how the measuring instrument of the aforesaid embodiment works.
Figure 3B:
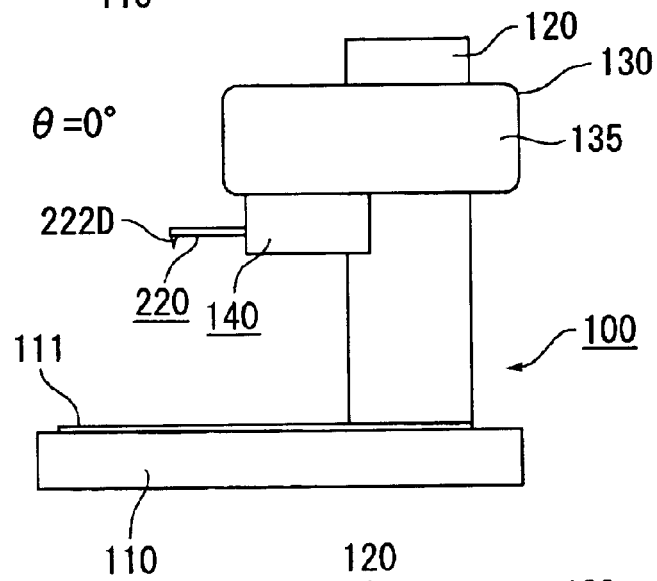

The arm 220 is swingably supported by the shaft 211 of the support 210 so that a predetermined measuring force can be applied on the stylus 222D when the axial direction of the stylus holder 222C of the measurement arm 222 aligns with the horizontal direction (normal condition) as shown in FIG. 3(B). Incidentally, when the stylus 222D is in contact with the surface of the workpiece 1 to measure the surface texture of the workpiece 1, a centroid position G of the entire arm 220 is located on a horizontal plane including the fulcrum, i.e. the center of the fitting hole 221A swingably supported by the shaft 211 of the support 210 when the arm 220 is inclined by an angle approximately in the middle of the angle range by which the support 210 of the body 140 can be turned.

Figure 3C:
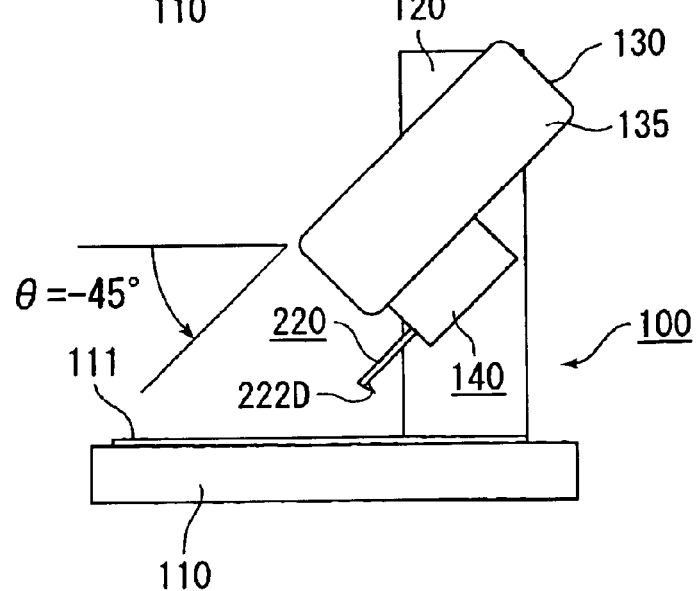

Specifically, the moving section 130 turns the body 140 within the inclination angle range shown in FIGS. 3(A) and 3(C) by driving the rotary section 132. In the present embodiment, the extension side of the stylus holder 222C of the arm 220 is turned by 10 degrees upward in the condition shown in FIG. 3(A), in other words, turned by +10 degrees relative to the condition shown in FIG. 3(B) where the axis of the stylus holder 222C extends in the horizontal direction. Further, in the condition shown in FIG. 3(C), the extension side of the stylus holder 222C of the arm 220 is turned by 45 degrees downward, i.e. turned by −45 degrees relative to the condition shown in FIG. 3(B) where the axis of the stylus holder 222C extends in the horizontal direction. As shown in FIG. 4, the arm 220 is swingably supported so that the centroid position G of the entire arm 220 is located on the horizontal plane including the fulcrum when the support 210 of the body 140 is inclined by an angle approximately in the middle of a central angle θ within the angle range of (+10 to −45 degrees) between the condition shown in FIG. 3(A) and FIG. 3(C), i.e. −17.5 degrees calculated according to the following formula (1).

$$(+10°-45°)/2=-17.5° \qquad (1)$$

As described above, the arm 220 is formed so that the centroid position G thereof is located at a predetermined position relative to the center of the fitting hole 221A. Since the measuring force setting means 223 for adjusting the measuring force is located at a position opposite to the centroid position G relative to the center of the fitting hole (i.e. the fulcrum of the swing movement) in the arm 220, the measuring force can be easily adjusted without changing a centroid angle (an angle from the fulcrum to the centroid position G relative to the horizontal surface including the fulcrum).

The movement sensor 230 has a cylindrical magnetic component 231 of iron and the like attached to the body 221 of the arm 220, and a cylindrical coil 232 provided on the lower side of the support 210. The magnetic component 231 is movable in the coil 232 approximately at the core thereof so that the axis of the magnetic component 231 is aligned with the core of the coil 232. The movement sensor 230 outputs a predetermined electric current by the movement of the magnetic component 231 caused by the swing movement of the arm 220 within the coil 232. The output electric current is outputted to a separately provided processor (not shown), in which the electric current value is analyzed to calculate the surface texture of the workpiece 1.

[[Operation of Measuring Instrument]]

Next, the operation of the measuring device of the aforesaid embodiment will be described below.

(Setting of Measuring Instrument)

The setting for measuring the contour of the workpiece using the measuring instrument will be described below with reference to the attached drawings. FIG. 5 is an illustration showing a displayed image of the arm by CAD (Computer Aided Design).

Initially, as a preparation step for the measurement, the arm 220 is adjusted so that the centroid position G of the arm 220 is located at a predetermined position. During the adjustment of the arm 220, three-dimensional model data of the respective components of the arm 220, i.e. the body 221, the arm 222A, the attachment 222B, the stylus holder 222C, the stylus 222D, the weight stick 223A, the measuring force weight 223B, the centroid weight 221B and the magnetic component 231, are prepared in accordance with the profile information thereof, i.e. design drawing, using CAD. Then, the three-dimensional model data of the respective components are combined to form three-dimensional model data of the arm 220 in a single coordinate system as shown in a displayed image 300 of FIG. 5. Incidentally, in forming the three-dimensional model data of the arm 220, the center of the fitting hole 221A to be the fulcrum of the arm is preferably set as the origin of the coordinate system.

Subsequently, the centroid moment of the respective components are calculated based on the barycentric coordinates and the mass of the respective components in the three-dimensional model data of the arm 220. Specifically, the centroid moment (the product of the barycentric coordinates and the mass) can be represented by x-direction component si and z-direction component ti as shown in the following formula (2), in which xi denotes x coordinate of the barycentric coordinates of the respective components, zi denotes z coordinate of the barycentric coordinates of the respective components and mi denotes the mass of the respective components.

$$(si, ti)=(xi*mi, zi*mi) \qquad (2)$$

As shown in the following formula (3), the coordinates of the centroid position G (X, Z) of the arm 220 are calculated based on the total of the barycentric coordinates of the respective components and the total mass of the arm 220. Specifically, the mass of the arm 220 is subtracted from the centroid moment at the centroid position G.

$$(X, Z)=(\Sigma si/\Sigma mi, \Sigma ti/\Sigma mi) \qquad (3)$$

The shape of the arm 220 is set by moving the centroid weight 221B of a predetermined mass as shown in FIG. 5 in a direction approximately orthogonal to the axis of the arm 222A so that thus-calculated centroid position G is located in +17.5 degrees direction from the center of the fitting hole.

Then, the arm 220 is adjusted so that the measuring force for abutting the distal end of the stylus 222D to the workpiece 1 becomes a predetermined value. Specifically, the measuring force F at the tip end of the stylus 222D is calculated by dividing the x-direction component of the centroid moment at the centroid position G of the arm 220 calculated by the formula (3) with a distance L from the fulcrum of the arm 220 to the stylus 222D, as in the following formula (4).

$$F=\Sigma si/L \qquad (4)$$

The shape of the arm 220 is set by, for instance, moving the measuring force weight 223B so that the measuring force F becomes a predetermined value.

The arm 220 is designed so that the centroid position G is located at a predetermined position and the measuring force F becomes a predetermined value. Thus obtained arm 220 is swingably supported by the shaft 211, so that the measuring instrument 100 can measure a workpiece with the predetermined measuring force F.

(Measuring Process of Measuring Instrument)

Next, the measuring process for measuring the contour of a workpiece using the measuring instrument will be described below with reference to the attached drawings. FIG. 6 is a graph showing how the measuring force is fluctuated in accordance with the inclination angle of the body 140.

Initially, the workpiece is positioned on the mount surface 111 of the base 110. Subsequently, the moving section 130, i.e. the vertical slider 131, the rotary section 132 and the horizontal slider 133 are driven to bring the distal end of the stylus 222D of the arm 220 adjusted in accordance with a predetermined condition into contact with the workpiece 1.

In this state, the moving section 130 is driven to be moved so that the stylus 222D relatively slides on the surface of the workpiece 1. The arm 220 swingably moves in accordance with the irregularities on the surface of the workpiece 1 by the relative movement of the stylus 222D. The magnetic component 231 provided on the arm 220 relatively moves within the coil 232 of the movement sensor 230 in accordance with the swing movement. The movement of the magnetic component 231 causes the coil 232 to generate an electric current of a predetermined current value corresponding to the movement of the magnetic component 231. The electric current value is read by the processor (not shown) to calculate the contour of the workpiece 1, which is, for instance, displayed as an image.

As shown in FIG. 4(B), even when the body 140 is rotated by driving the rotary section 132 of the moving section 130 so that the arm 220 is inclined, since the centroid position G is located on the horizontal plane including the fulcrum when the body 140 is inclined at the angle in the middle of the turning range thereof, a distance Ig from the centroid position G to the fulcrum in the horizontal direction becomes the maximum. When the body is inclined at the maximum or minimum angle of the turning range, the distance Ig takes the same minimum value. In other words, the variation from the maximum value to the minimum value of the distance lg becomes the minimum, which minimizes the variation of the measuring force. Accordingly, the distance Lg in the horizontal direction between the centroid position G and the fulcrum when the arm 220 is at the normal condition shown in FIG. 4(A) is within the range between the maximum value and the minimum value, so that the fluctuation of the distance lg can be restrained even when the body 140 is turned. Accordingly, the centroid moment at the centroid position G can be restrained to the minimum, and the measuring force does not cause great difference. Accordingly, the measuring force F varies little over the entire angle range (−45 to +10 degrees) within which the body 140 is turned as shown in FIG. 6.

On the other hand, when the centroid position G is out of the turning angle range and located approximately above the fulcrum, the measuring force F is greatly fluctuated as shown in FIG. 6 in accordance with the relationship between the measuring force F and the centroid moment calculated by the above formula (4).

Accordingly, by designing the arm 220 that is swingably supported so that the centroid position G of the arm 220 is located on the horizontal plane including the fulcrum when the body 140 is inclined by the angle in the middle of the turning angle range thereof, the measuring force F hardly changes even when the body 140 is inclined, so that further position adjustment of the measuring force weight 223B after inclining the body is unnecessary, and the measurement process can be conducted without interruption, thereby improving the measurement efficiency. An arrangement for adjusting the measuring force F at a constant level is not necessary, so that the structure can be simplified, thereby improving the productivity and reducing the production cost. Further, the measuring force F is not fluctuated when the workpiece is measured while being inclined, so that the influence of the swinging movement of the arm 220 caused by adjusting the measuring force F at a constant level can be eliminated and excellent measurement result can be obtained.

[Advantages of Measuring Instrument]

As described above, the arm 220 having the stylus 222D to be in contact with the workpiece 1 is swingably supported in the above embodiment so that the centroid position G is located on the horizontal plane including the fulcrum for supporting the arm 220 when the body 140 capable of turning within the predetermined angle range of +10 to −45 degrees relative to the workpiece 1 is inclined by the angle −17.5 degrees that is in the middle of the angle range. Accordingly, the variation of the distance Lg from the fulcrum to the centroid position G caused by the presence and degree of the inclination of the support 210 can be minimized and the fluctuation of the measuring force F with which the stylus 222D of the arm 220 is in contact with the workpiece 1 can be restrained to the minimum, so that the measurement process can be conducted without adjusting the measuring force F by setting the measuring force F in advance even when the support 210 is inclined, thereby easily obtaining an excellent measurement result.

The centroid position G of the arm 220 is calculated based on the centroid moment calculated by the barycentric coordinates of the respective components of the arm 220 around the fulcrum of the arm 220 and the mass of the respective components. Accordingly, the arm 220 can be swingably supported on the support 210 so that excellent measurement results can be easily obtained by restraining the fluctuation of the measuring force F to the minimum, which can be calculated by CAD using the design drawing in manufacturing the respective components, so that the productivity can be improved.

The barycentric coordinates of the components are calculated based on the three-dimensional model data of the components of the arm 220 by computer aided design (CAD). Accordingly, the centroid position G of the arm 220 can be easily obtained by CAD, which allows the arm 220 to be easily swingably supported by the support 210 so that the fluctuation of the measuring force F can be minimized and excellent measurement result can be obtained, thereby improving the productivity. Especially, with the use of the design drawing of the respective components, the centroid position G can be more easily calculated and the productivity can be further improved.

The measuring force setting means 223 for adjusting the stylus 222D to be in contact with the workpiece 1 with the predetermined measuring force F is provided on the arm 220 at a position opposite to the centroid position G of the arm 220 relative to the center of the fitting hole 221A as the swing fulcrum of the support 210 Accordingly, even when the measuring force setting means 223 works in adjusting the measuring force F, since the measuring force setting means 223 is located approximately opposite to the centroid position G, the centroid angle is hardly fluctuated, so that the measuring force that prevents the magnification of the fluctuation of the centroid position G by the movement of the support 210 by adjusting the measuring force F can be easily adjusted, thereby easily adjusting the arm 220.

The measuring force setting means 223 has the measuring force weight 223B capable of moving in a direction toward and away from the center of the fitting hole 221A as the center of the swing movement of the arm 220 supported by the support 210. Accordingly, even when the support 210 is moved, the fluctuation of the measuring force F can be minimized with a simple structure and the measuring force F can be easily adjusted to obtain an excellent measurement result, thereby improving the productivity. Even when the measuring process is conducted with different measuring force F, the fluctuation of the measuring force F can be restrained only by moving the measuring force weight 223B, so that the measuring force F can be easily changed.

The arm 220 is designed so that the centroid position G of the arm 220 is located on the horizontal plane including the fulcrum with the body 140 being inclined at an angle in the middle of the inclination angle range within which of the support 210 can be moved and the measuring force F with which the stylus 222D of the arm 220 is in contact with the workpiece 1 becomes a predetermined value. Accordingly, once the measuring force F has to be set in manufacturing the measuring instrument 100, it is not necessary for a user to adjust the measuring force F until the measuring force F is re-adjusted, so that the measuring instrument can be immediately used, thereby easily improving the measuring efficiency.

[Modifications]

Incidentally, the scope of the present invention is not restricted to the above embodiment, but includes the following modifications and the like.

Though the arm 220 is designed so that the centroid position G is located at a predetermined position and the measuring force F becomes a predetermined value in the above embodiment, another arrangement is possible where the arm 220 is adjusted after being supported so that the predetermined measuring force F can be obtained to locate the centroid position G on the horizontal plane including the fulcrum when the body 140 is inclined by an angle in the middle of the turning angle range thereof or the arm 220 is designed so that the predetermined measuring force F can be obtained and subsequently being supported so that the centroid position G is located at a predetermined position.

The centroid position G may not be designed using CAD but may be designed in any manner and the arm 220 may be formed in any manner as long as the centroid position G is located at a predetermined position by various measuring instruments.

The measuring force setting means 223 may not use the measuring force weight 223B but may be designed in any manner. However, with the use of the measuring force weight 223B, an arrangement capable of avoiding restriction on the swing movement of the arm 220 and obtaining an excellent measurement result can be obtained, so that productivity can be improved.

The swinging body may not be formed in the shape of the arm 220 but may be designed in any shape and the probe may not be attached on an end of the swinging body and be shaped in any manner as long as the probe can be in contact with a workpiece.

The body may not be arranged in the support 210 as long as the arm 220 can be swingably supported.

The moving section 130 for moving the body relative to the workpiece 1 may be designed in any manner as long as the stylus 222D is in contact with the workpiece 1 by the relative movement thereof, where, for instance, the workpiece 1 is moved without moving the body on which the workpiece 1 is mounted or both of the workpiece and the body are moved.

Though the measuring instrument 100 measures the surface texture of the workpiece 1 in the above embodiment, the measuring instrument may measure any properties and characteristics such as surface hardness and surface temperature with a probe.

Specific structure and process in implementing the present invention may be arranged in any manner as long as an object of the present invention can be achieved.

What is claimed is:

1. A measuring instrument, comprising: a body movable relative to a workpiece;

a swinging body swingably supported by the body and having a probe to be in contact with the workpiece; and a movement sensor for detecting a swinging movement of the swinging body, wherein the body is movable so that the body is inclined within a predetermined angle range relative to a horizontal surface, wherein the swinging body is swingably supported so that a centroid position thereof is located on a plane parallel to the horizontal surface including a point where the swinging body is supported by the body when the body is inclined by an angle approximately in the middle of the predetermined angle range.

2. The measuring instrument according to claim 1, wherein the centroid position of the swinging body is calculated based on a centroid moment calculated in accordance with barycentric coordinates of components of the swinging body with a fulcrum of the swinging body being set as an origin and the mass of the components.

3. The measuring instrument according to claim 2, wherein the barycentric coordinates of the components of the swinging body are calculated based on three-dimensional data of the components by computer aided design.

4. The measuring instrument according to claim 1, wherein the swinging body has a measuring force setting means for bringing the probe into contact with the workpiece with a predetermined measuring force, the measuring force setting means being provided on a side opposite to the centroid position of the swinging body relative to the fulcrum supported by the body.

5. The measuring instrument according to claim 4, wherein the measuring force setting means is a measuring force weight capable of moving toward and away from the fulcrum at which the swinging body is supported by the body.

6. The measuring instrument according to claim 1, wherein the swinging body has a centroid weight capable of moving in a direction approximately orthogonal to a line connecting the fulcrum supported by the body and a distal end of the probe, wherein the centroid position is adjusted by moving the centroid weight.

* * * * *